Nov. 3, 1931.  E. E. GLASS  1,830,394

UNIVERSAL JOINT

Filed July 21, 1928

Inventor
ERNEST E. GLASS,

By
Attorney

Patented Nov. 3, 1931

1,830,394

UNITED STATES PATENT OFFICE

ERNEST E. GLASS, OF SAN FERNANDO, CALIFORNIA

UNIVERSAL JOINT

Application filed July 21, 1928. Serial No. 294,423.

This invention relates to universal joints and an object is to provide an improved type of coupling arranged for operably connecting a driven shaft with a driving shaft in order to permit universality of movement and arranged in compact form with a minimum number of parts of simple design so designed that the wearing parts may be readily replaced at will.

Another object is to provide a universal coupling free from complicated and expensive machine operations attendant upon its manufacture and comprising a socket member with a detachable cap thereon, a knuckle arranged for movement in but one direction in the socket and a yoke confined between the socket member and the cap engaging the knuckle and arranged for movement within the socket at right angles to the direction of movement of the knuckles.

Other objects may appear as the description progresses.

In the drawings I have shown a preferred embodiment of my invention subject to modifications within the scope of the appended claims without departing from the spirit thereof.

Figure 1:
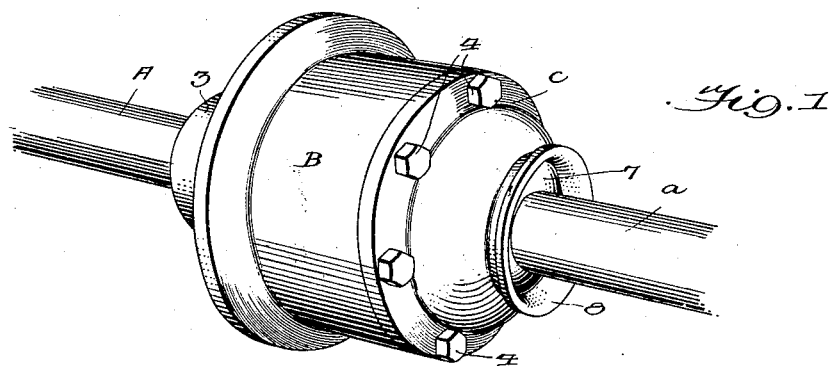
Fig. 1 is a perspective view of an assembled coupling embodying my improvements.
Figures 2, 3:
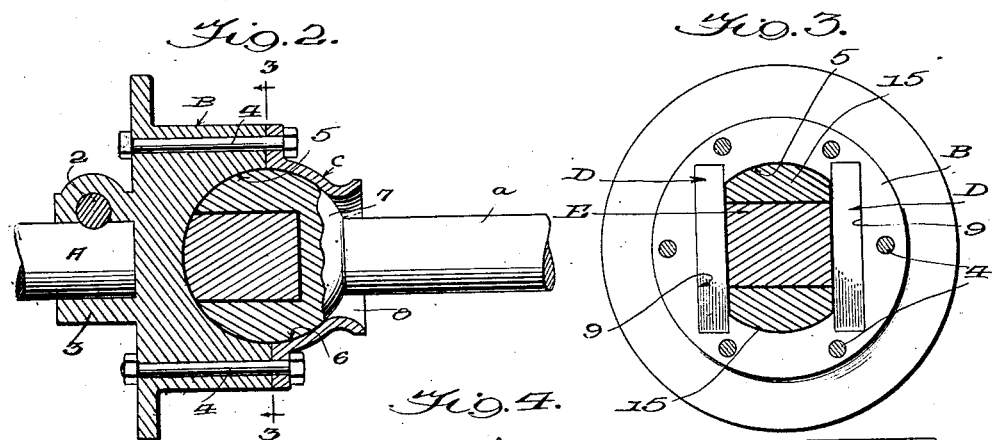
Fig. 2 is a longitudinal section thereof.
Fig. 3 is a transverse section on line 3—3 of Fig. 2.

A represents a driving shaft and $a$ represents a driven shaft arranged to be operatively connected by means of my improved coupling. The coupling proper includes a socket member B arranged to be attached to the driving shaft A through the medium of a pin or key as at 2, extending through a boss 3 integrally formed with the member B. A cap C may be detachably held on the socket member B by means of a plurality of bolts 4—4, etc. as shown in Fig. 2. The members B and C have semi-spherical recesses 5 and 6 respectively, formed therein which, when said members are attached together as shown in Fig. 2, form a spherical socket for a spherically formed head or yoke 7 formed on or attached to the driven shaft $a$.

The cap C has an opening 8 in its outer end which is of substantially larger area than the shaft $a$ so as to permit the operation of the shaft at a substantial angle from the axis of the driving shaft A.

Figure 4:
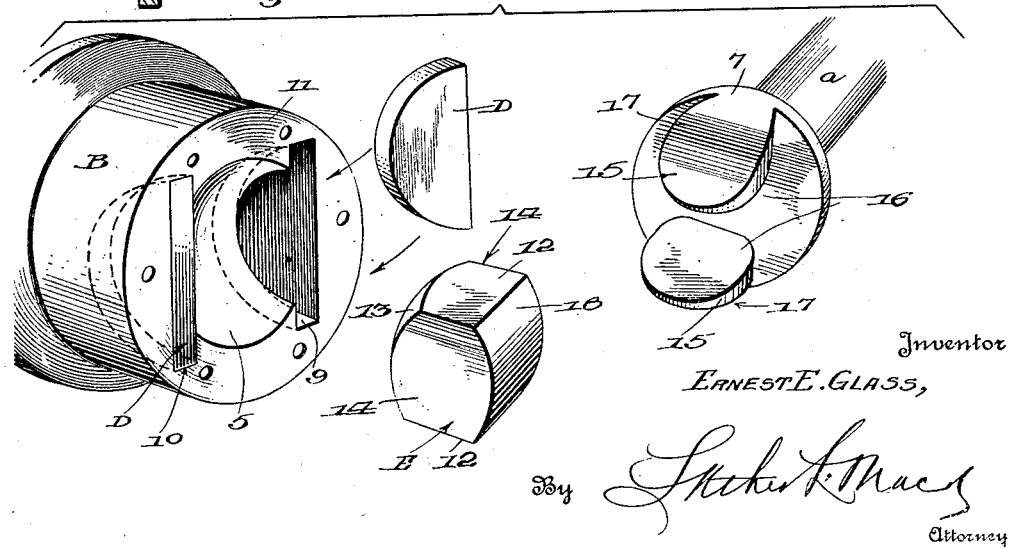
Fig. 4 is a composite view showing the socket member, a knuckle, the replaceable keys and the yoke of the driven member separated and in perspective for the purpose of clearly illustrating the form of said parts.

Socket member B is provided with a pair of transversely spaced slots 9 and 10 which intersect and cut off opposite portions of the spherically formed recess socket 5 in the member B as shown in Fig. 4. Said slots extend outwardly from and below the periphery of the socket 5, and are adapted to receive replaceable hardened steel keys at a D, which are of semi-circular form. The curved portions of the keys D seat in the slots 9 and 10 below the bottom of the socket 5 and the outer edges are substantially flush with the outer face 11 of the member B.

Intermediate the keys D—D and within the socket 5 I provide a knuckle E which has flattened ends 12—12 adapted to movably engage the inner sides of the keys D—D and a rounded bottom portion 13 conforming to the bottom of the socket 5. Thus the knuckle E is permitted to rock laterally in the socket 5 but is prevented from movement in another direction.

The knuckle E is of rectangular cross-section and the sides 14—14 thereof are adapted to movably seat between lugs 15—15 which extend inwardly from a head 7 of member $a$, and are transversely spaced apart corresponding to the width of the member E. The opposite inner faces 16, 16 of the lugs 15, 15 are parallel while the outer faces 17—17 of said lugs are curved to conform to the spherically formed sockets 5 and 6 in the members B and C. Thus the head 7 may rock in the socket with the knuckle E. The outer face 18 of knuckle E is slightly curved so as to fit within the yoke of the head 7 so as to provide ample clearance to permit the rocking of the yoke on the knuckle E and to permit universal movement of the driven shaft $a$ with respect to the driving shaft A. The spherically formed body of head 7 from which the lugs 15, 15 extend is spaced from the outer edges of the keys D, D so as to permit the rocking of the head transversely over the keys.

It will be noted by particular reference to Fig. 4 that the several parts forming the universal joint proper are held in operative relation by means of the bolts 4 when the cap C is properly positioned on the member B, and as in other types of couplings the knuckle E is not pivotally connected to the members B or a, by means of trunnions, pins, or the like.

The members B and E and 7 may be formed of hardened steel so as to provide for long life and such members may be readily replaced by removing the cap C from the body B. The slots 9 and 10 which hold the keys D may be quickly and accurately formed by ordinary milling cutters so that the keys may be removed for replacement or other purposes.

When the device is assembled, grease may be packed in the socket between and around the several members so as to provide for proper lubrication.

What I claim is:

1. A universal joint comprising a pair of separable members provided with a spheroidal socket therein, a pair of parallel keys mounted in one of said members at diametrically opposite points and intersecting the periphery of the socket, a knuckle seated in said socket having flattened faces engaging said keys and adapted to rock in a given direction in said socket and a yoke having a spherically formed head confined within said members and provided with lugs overlying the sides of said knuckle and provided with a stem extending through one of said members as described.

2. A universal joint comprising a body having a spherically formed socket therein, a cap detachably held thereon and recessed to provide a continuation of said socket, a pair of parallel driving keys held in one of said members and intersecting and cutting off portions of the sockets therein, a yoke confined in the sockets of said cap and said body and a knuckle operatively engaging said yoke and said keys to permit the movement of the said yoke universally with respect to said body.

3. A universal joint comprising a pair of cup-shaped members detachably held together and having a spheroidal socket formed therein, a spherically formed yoke movably held in said socket and having a stem extending through an opening in one of said members, a knuckle movable in but one direction in said socket, said yoke movable with the knuckle and additionally movable in a direction at right angles to the movement of the knuckle for permitting universal movement of the yoke with respect to the body.

4. A universal joint comprising a separable body composed of a pair of separable members having a spheroidal socket therein and adapted for attachment to a driving member, a spherically formed yoke movably seated in said socket and adapted for connection with the driven member, a knuckle operatively held in said socket and engaging said yoke and means in said socket also disconnected from but engaging said knuckle to permit the movement of the yoke and knuckle together in a given direction, said yoke being movable in a relatively right-angle direction to permit the universal movement of the driven shaft.

5. A universal joint comprising a body member having a semi-spherical socket therein open at one side, longitudinally disposed slots being formed in said body at diammetrically opposite points intersecting the periphery of said socket, keys replaceably held in said slots and having their outer edges flush with the open face of said body, a knuckle seated in said socket and provided with flattened ends engaging said keys and a spherically formed lower face engaging the bottom of said socket permitting the rocking of said knuckle in but one direction, a driven member provided with a spherically formed yoke engaging said socket and said knuckle and a cap detachably held in said body for holding all of said members in operative engagement, said yoke being movable with said knuckle in one direction and further movable relative to said knuckle in a relatively right angular direction.

6. A universal joint comprising a separable body having a spherical socket therein, a spherically formed yoke confined in said socket, a knuckle of rectangular cross-section having its opposite sides engaging said yoke, and means detachably held in said socket at diametrically opposite points for engagement with the opposite ends of said knuckle to permit the movement of the knuckle and yoke together in a given direction and a further movement of the yoke with respect to the knuckle in a relatively right-angular direction.

7. A universal joint comprising in combination with a driven shaft and a driving shaft a separable body fixed to the driving shaft and provided with a spherical socket, a spherically formed yoke connected with the driven shaft and movably disposed in said socket, a knuckle of right angular cross-section having a spherically formed face seated in said socket and its opposite sides engaging opposite portions of said yoke, and a pair of keys held in said body at diametrically opposite points intersecting the periphery of said socket and engaging the opposite ends of said knuckle, as described.

8. A universal joint comprising a separable body having a spherical socket therein, one member of said body having a pair of longitudinally disposed slots cutting the periphery of the socket at diametrically opposite points, the peripheries of said slots extending beyond the periphery of the socket, a pair of keys detachably held in said slots, a knuckle held in the socket between and having its opposite ends engaging said keys, a spherically formed yoke confined in said socket between the members of said body and having spaced lugs engaging opposite sides of said knuckle, said knuckle being movable in one direction only in said socket, said yoke being movable with the knuckle in such direction and further movable in a relatively right angular direction on said knuckle, as described.

ERNEST E. GLASS.